(12) United States Patent
Altbaum et al.

(10) Patent No.: US 9,408,070 B2
(45) Date of Patent: Aug. 2, 2016

(54) WIRELESS INTERNET ACTIVATION SYSTEM AND METHOD

(75) Inventors: Leonardo Daniel Altbaum, San Diego, CA (US); Kotaro Matsuo, Poway, CA (US); Randy Elwin, Cardiff by-the sea, CA (US)

(73) Assignee: Kyocera Corporation, Kyoto (JP)

( * ) Notice: Subject to any disclaimer, the term of this patent is extended or adjusted under 35 U.S.C. 154(b) by 355 days.

(21) Appl. No.: 11/470,178

(22) Filed: Sep. 5, 2006

(65) Prior Publication Data

US 2008/0057957 A1 Mar. 6, 2008

(51) Int. Cl.
| | |
|---|---|
| *H04M 1/66* | (2006.01) |
| *H04W 8/24* | (2009.01) |
| *H04W 80/04* | (2009.01) |
| *H04L 29/08* | (2006.01) |

(52) U.S. Cl.
CPC ............... *H04W 8/245* (2013.01); *H04L 67/02* (2013.01); *H04L 67/04* (2013.01); *H04L 67/34* (2013.01); *H04W 80/04* (2013.01)

(58) Field of Classification Search
USPC ........................................................ 455/419
See application file for complete search history.

(56) References Cited

U.S. PATENT DOCUMENTS

| | | | | |
|---|---|---|---|---|
| 5,794,142 | A * | 8/1998 | Vanttila et al. ................ 455/419 |
| 6,381,454 | B1 * | 4/2002 | Tiedemann et al. .......... 455/419 |
| 6,493,549 | B1 * | 12/2002 | Axelson et al. ............... 455/419 |
| 6,546,243 | B2 * | 4/2003 | Tiedemann et al. .......... 455/419 |
| 6,549,770 | B1 * | 4/2003 | Marran ......................... 455/419 |
| 6,549,771 | B2 * | 4/2003 | Chang et al. .................. 455/419 |
| 6,587,684 | B1 * | 7/2003 | Hsu et al. ...................... 455/419 |
| 6,647,260 | B2 * | 11/2003 | Dusse et al. .................. 455/419 |
| 6,725,056 | B1 * | 4/2004 | Moles et al. .................. 455/524 |
| 6,731,930 | B2 * | 5/2004 | Robin et al. .................. 455/419 |
| 6,741,855 | B1 * | 5/2004 | Martin et al. ................. 455/419 |
| 6,778,828 | B1 * | 8/2004 | Chander et al. ............ 455/435.1 |

(Continued)

FOREIGN PATENT DOCUMENTS

| | | |
|---|---|---|
| EP | 1 113 641 A | 7/2001 |
| WO | WO 03/007633 | 1/2003 |

(Continued)

OTHER PUBLICATIONS

Internet Document: "Telespree Self-Service Set-Up: Automated Activation" at www.telespree.com/solutions/automated_activation.htm (accessed Mar. 15, 2007).

(Continued)

*Primary Examiner* — Suhail Khan

(57) ABSTRACT

A wireless modem device is configured for connection over a cellular carrier network to a second network. The device is initially in a non-activated mode in which the wireless modem device can only be connected to an authorization server of a cellular carrier network and cannot communicate outside the boundaries of an activation service for the wireless modem device. Activation is initiated by the cellular carrier network on receipt of a request from the wireless modem device to access a web resource address (URL) of the second network. The handset is connected to the carrier authorization server if the wireless modem device has not been activated, and is provided with an activation page at the authorization server. The authorization server activates the wireless modem device for wireless connection to the second network through the cellular carrier network.

20 Claims, 4 Drawing Sheets

(56) References Cited

U.S. PATENT DOCUMENTS

| | | | |
|---|---|---|---|
| 6,876,644 B1* | 4/2005 | Hsu et al. | 370/338 |
| 6,879,585 B2* | 4/2005 | Sandhu | 370/355 |
| 6,915,126 B2* | 7/2005 | Mazzara, Jr. | 455/411 |
| 6,934,530 B2* | 8/2005 | Engelhart | 455/406 |
| 6,961,567 B1* | 11/2005 | Kuhn | 455/435.1 |
| 6,970,678 B1* | 11/2005 | Ditzik | 455/11.1 |
| 7,023,909 B1* | 4/2006 | Adams et al. | 375/222 |
| 7,024,557 B1* | 4/2006 | Moles et al. | 713/170 |
| 7,043,263 B2* | 5/2006 | Kaplan et al. | 455/466 |
| 7,133,677 B2* | 11/2006 | Feder et al. | 455/443 |
| 7,165,173 B1* | 1/2007 | Herle | 713/151 |
| 7,305,090 B1* | 12/2007 | Hayes et al. | 380/249 |
| 7,336,945 B2* | 2/2008 | Ringen et al. | 455/418 |
| 7,349,710 B2* | 3/2008 | Kaplan et al. | 455/466 |
| 7,352,866 B2* | 4/2008 | Panjwani et al. | 380/270 |
| 7,356,001 B1* | 4/2008 | Jones et al. | 370/331 |
| 7,356,330 B2* | 4/2008 | Whittington et al. | 455/411 |
| 7,363,354 B2* | 4/2008 | Lahti | 709/219 |
| 7,509,417 B1* | 3/2009 | Kammer et al. | 709/225 |
| 2007/0260877 A1* | 11/2007 | Adams et al. | 713/156 |

FOREIGN PATENT DOCUMENTS

| | | |
|---|---|---|
| WO | WO 2004/084465 | 9/2004 |
| WO | WO 2005/039204 | 4/2005 |

OTHER PUBLICATIONS

Internet Document "Future Dial—Jan. 9, 2006 News Announcement" at www.futuredial.com/release020907/news/PDF_01_09_2006_FD_Announces_Deployment_of_MMP_with_Sprint.pdf (Mar. 15, 2007).

* cited by examiner

WIRELESS INTERNET ACTIVATION SYSTEM AND METHOD

TECHNICAL FIELD

The present invention relates generally to wireless Internet communications and, more particularly, to a system and method for activating a handset or portable wireless device for services.

BACKGROUND

Users of wireless handsets or handheld communication devices such as mobile phones, personal digital assistants (PDA), and handheld or portable personal computers while traveling or away from home or the office often need Internet access to look up information or to link to private networks. Hotels, Internet cafes, and the like provide Internet wired or wireless Internet connections for a one-time fee.

Recently, high speed cellular networks have been introduced by various companies to allow a user who is away from home or an office to connect to the Internet at any time, anywhere within the cellular network, for a monthly fee. Various handheld devices and portable laptop computers are currently provided with the hardware and software already embedded to provide high speed cellular network service for Internet access. Existing devices can be set up for high speed wireless data access using a high speed wireless access card or PC modem card which can be purchased and installed by a user on their device, for example using a card slot on the device. One such wireless modem card is an Evolution-Data Optimized (EVDO) Personal Computer (PC) Card, for example the Kyocera KPC650 for use over a code division multiple access (CDMA) EVDO network. EVDO PC cards are activated for wireless network service from the associated service provider after installation.

In order to activate a high speed wireless network service card on a cellular network, it is currently necessary to provide the user with a compact disk (CD) having an installer application which guides the user through the activation process. The process may be automatic, using over the air service provisioning (OTASP), Internet over the air (IOTA), or similar procedures. Alternatively, the process may be manual, where the user has to input certain parameters, such as the electronic serial number (ESN) of the card and other details, in order to activate the card. This activation process requires a prior agreement between the cellular carrier providing the high speed wireless data service and the original equipment manufacturer (OEM), i.e. the manufacturer of the wireless PC card or EVDO PC card or device. Technical, language, and branding issues have to be taken into account prior to each carrier's launching to accept a device on their network. The OEM typically customizes an application for each carrier, operating system, language and branding. Launching of the application by each new cellular carrier will be delayed because the custom application must first be developed and maintained.

SUMMARY

Disclosed herein is an improved system and method for activating a handset or portable device for wireless Internet communications via a cellular service network.

According to one embodiment, a method for activating a handset or other host device for wireless service comprises receiving a request to access a web resource address ("URL") from a wireless modem device over a cellular network, determining whether the wireless modem device has been activated for connection to a network associated with the URL, directing the communication from the wireless modem device to an activation page of an authorization server of the cellular network if the wireless modem device has not been activated, receiving activation information associated with the wireless modem device at the authorization server, and activating the wireless modem device for connection to the network over the cellular network.

The user of the handset or other portable device may be prompted to enter sign up information on the activation page, such as the card electronic serial number (ESN), user identification and billing information, and the like. The authorization server will then initiate an over the air service provisioning (OTASP), Internet over the air (IOTA), or similar activation and provisioning procedure. After activation, the cellular network will recognize the card as an activated card, and will change the network parameters to regular Domain Name System (DNS), Internet Protocol (IP) and gateway addresses in order to access the full extent of the network, through a dynamic host configuration protocol (DHCP) or similar mechanism.

According to one embodiment, a wireless network activation system for activating a handset or other portable electronic device for wireless network or Internet service is provided, which comprises a cellular network linked to a second network, and a cellular network authorization server configured for detecting requests from non-activated wireless modem devices to access a web resource address ("URL") of the second network over the cellular network, the authorization server having a provisioning module configured for activation and provisioning of any detected non-activated wireless modem devices.

The authorization server is configured to initiate an activation procedure on receipt of a network communication attempt by a wireless modem device or card which has not yet been activated. The network activation status may be determined by the cellular carrier network by checking its subscriber database for the activation status associated with that particular wireless modem device. The authorization server may be configured with an activation page which is sent to the handset or portable device on detection of a public network communication attempt using a non-activated wireless modem card. After activation of the wireless modem card, it will be recognized by the carrier network as an activated card and will be enabled for access to the full extent of the public network through DHCP or a similar mechanism.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts.

DETAILED DESCRIPTION

Certain embodiments as disclosed herein provide for an activation system and method for activating a wireless modem card or like device installed in a handset or other wireless device in order to provide access to a public network, such as the Internet. For example, one method as disclosed herein allows for activation of an Evolution-Data Optimized (EVDO) PC card on a Code Division Multiple Access (CDMA) network.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
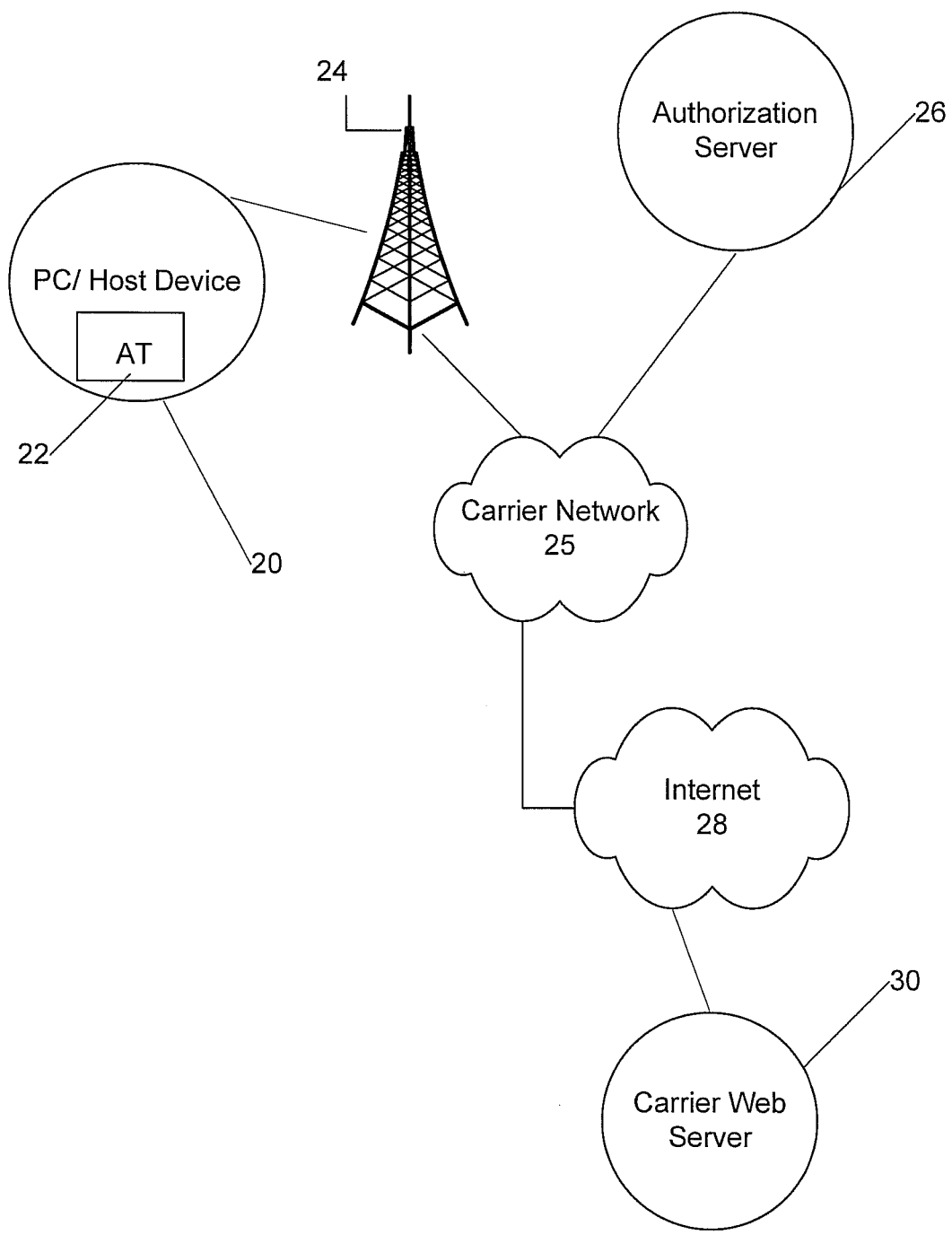
FIG. 1 is a block diagram illustrating an example of a wireless network activation system for a handset or host device according to an exemplary embodiment of the invention.

In the embodiment of FIG. 1, an activation system comprises a handset or host device 20 having a wireless modem device 22 such as an EVDO card or Access Terminal (AT), a network access point or base station 24, a cellular carrier network 25, an authorization server 26 of the cellular carrier, and a second network 28 such as the Internet which is connected to various web servers 30.

The host device or handset 20 can be any of a variety of portable wireless communication devices, including a cell phone, personal digital assistant ("PDA"), laptop computer, handheld computer, or any combination of these and other devices capable of being carried by a user for wireless voice and data communication purposes when the user is away from his or her home or place of work. An example general purpose wireless device is later described with respect to FIG. 4. The host device 20 may be referred to herein as a handset, wireless device, mobile device, device, wireless unit, mobile unit, or access terminal (AT).

In the embodiment of FIG. 1, a wireless modem device such as an EVDO PC card or an AT 22 is installed in the handset 20. Such devices can be purchased by users for use in conjunction with a cellular carrier network 25 such as a CDMA network to allow high speed wireless network communications over a public network. In this embodiment, network 25 is a CDMA (EVDO) network.

Figure 2:
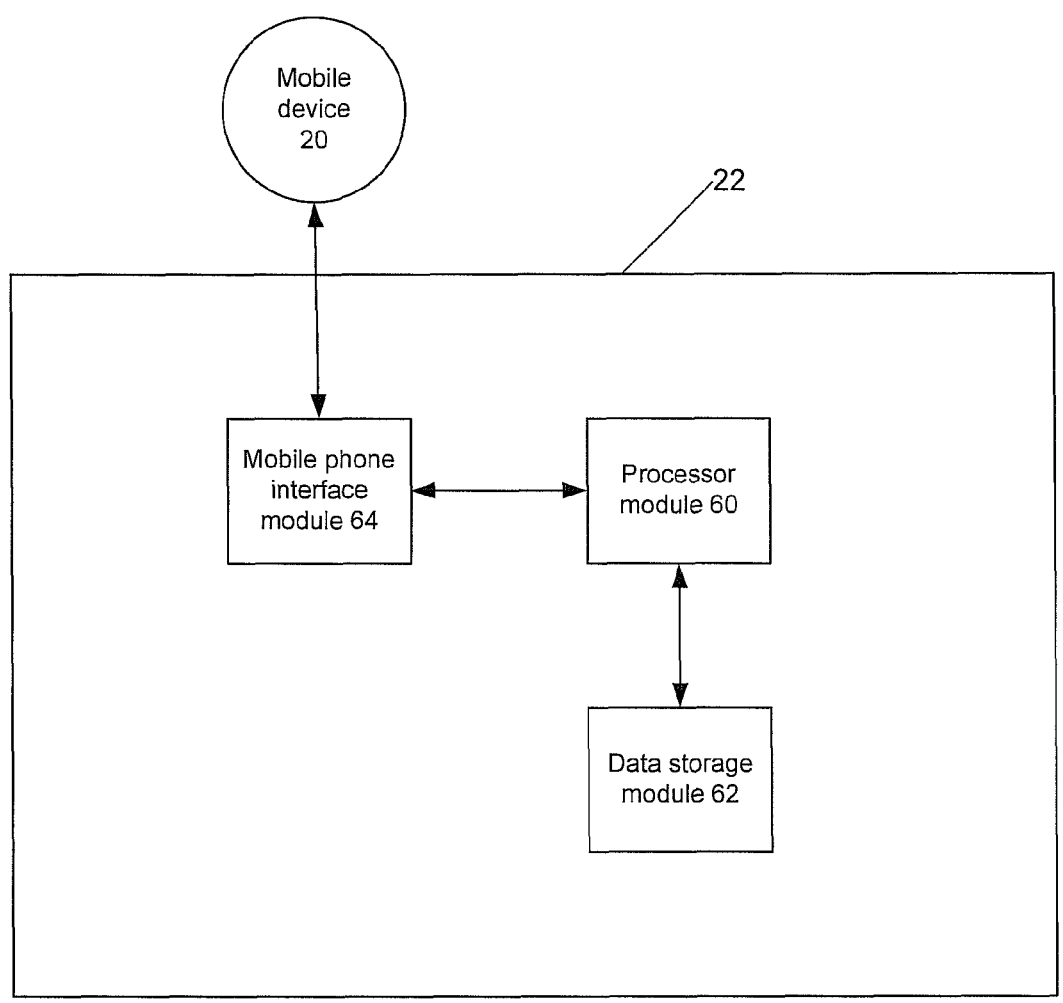
FIG. 2 is a block diagram illustrating an example wireless modem device coupled with the handset or host device according to an exemplary embodiment of the invention.

FIG. 2 is a block diagram of a wireless modem card 22 according to an exemplary embodiment of the invention coupled to a handset 20, which may be a cellular phone as illustrated or other host devices. It will be understood that the wireless modem device may be a card which is removably installed in a card slot or the like provided in the handset 20, or may be originally integrated with the handset 20 on manufacture.

Referring to FIGS. 1 and 2, the card or network access terminal 22 comprises a processor module 60 configured to establish communication with the second network 28 through carrier network 25 via wireless communication device 20, a data storage module 62 connected to processor module 60, and a mobile phone or host device interface module 64 configured to connect the processor module 60 to the host device 20, which in the illustrated example is a mobile phone. The wireless modem card 22 has an associated unique identification number or electronic serial number (ESN) stored in data storage module 62, as well as a stored network activation status associated with the card. Initially, the activation status stored will be "not activated", and this will convey to the subscriber or purchaser on installation of the card that activation is required, and in certain embodiments, without querying the network. The data storage module may also contain other authentication keys for security purposes. These ESNs and keys may be populated by the card manufacturer and a file of the ESNs and keys is also sent by the manufacturer to the carrier via secure means. The carrier stores this information in a secure subscriber database, and therefore has a secure subscriber database of identification information for every card which the carrier will allow on its network. An attempt to activate a card implies a subscriber has purchased service and requires a phone number and other service provisioning items. Activation status is always stored in the carrier's subscriber database, typically keyed by ESN.

The processor module 60 of the wireless modem card 22 is configured to automatically transmit identification information to the cellular tower station or access point every time a cellular call is placed or a request for access to the second network is made. The actual ESN is normally not transmitted over the air, but instead industry-standard techniques are used to securely identify a card at the cellular network without directly transmitting an ESN.

In this embodiment, the activation status stored in the subscriber database will include a second network or Internet activation status as a component of the carrier network 25. If the card has not yet been activated, the network activation status stored in the subscriber database for that card is "not activated".

Figure 3:
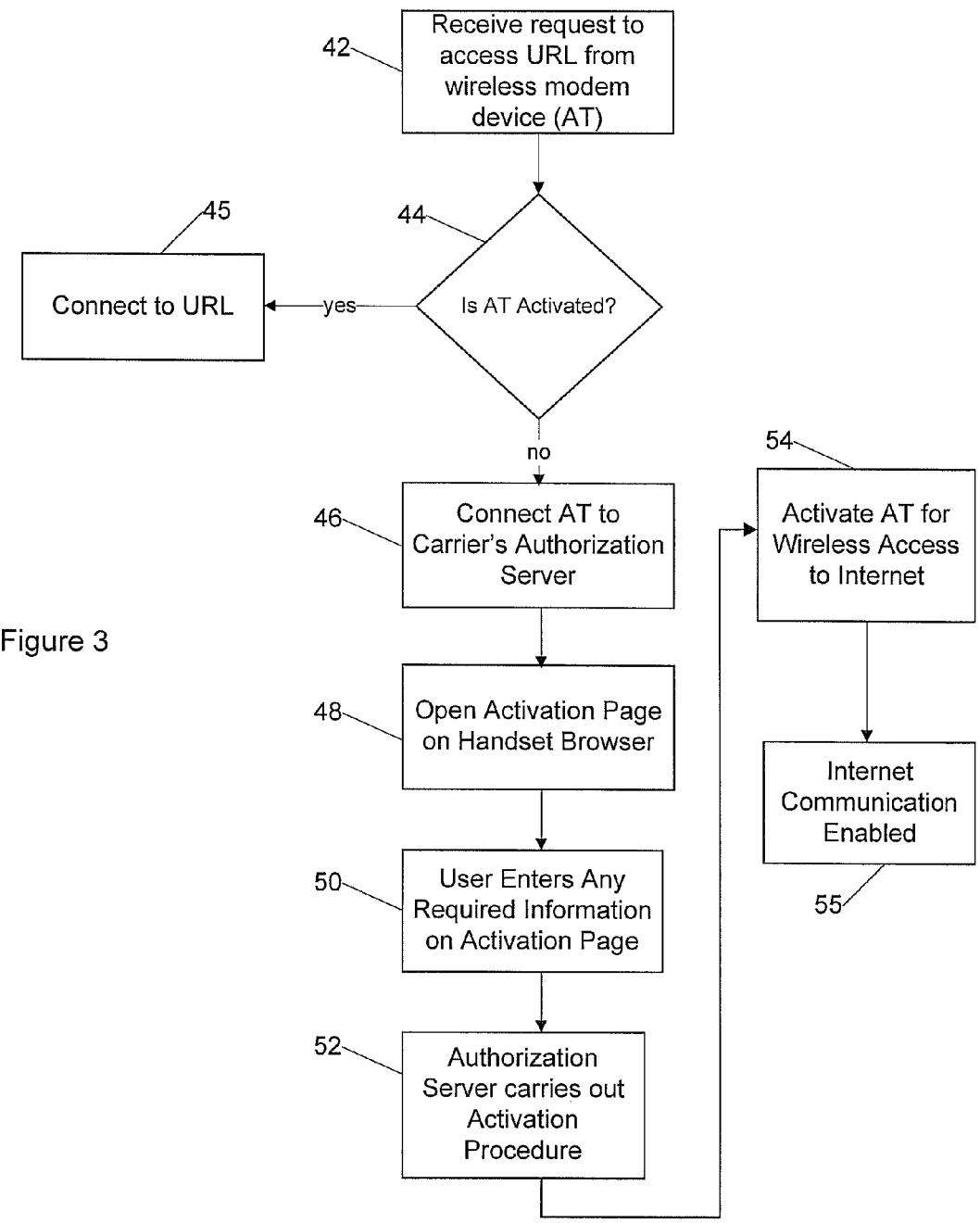
FIG. 3 is flow diagram of an example activation method using the system of FIG. 1.

FIG. 3 illustrates a method for activating the wireless modem card 22 of FIG. 2 in the system of FIG. 1 in one embodiment of the present invention. The card 22 will initially be in a non-activated state, which means it is factory provisioned to connect to the carrier network 25, but not to talk directly to the Internet, i.e. it cannot send and receive data over the Internet or public network 28 (in the same way that a cell phone without service "talks" to a carrier network but does not allow any outgoing or incoming calls). This non-activated state is provided by a dynamic host configuration protocol DHCP or similar mechanism which assigns IP network parameters for a non-activated profile when the network backend or base station 24 recognizes the card as non-activated, by checking the network activation status for the card in the subscriber database. The non-activated profile will be configured in such a way that DNS information will always point to an activation page at a carrier authorization server 26 and will not allow for communication outside the boundaries of the activation service.

In FIG. 3, a cellular or carrier network receives a request from a wireless modem device or access terminal to access a web resource address or URL of a second network 28, which may be the Internet (step 42). The base station or access point 24 (or other network device) will first determine whether the modem card 22 is activated (step 44). In one embodiment, the activation status of card 22 is determined by the network by identifying the card (e.g., via ESN) and checking the subscriber database for the status associated with the card. If the card status associated with the card's ESN for the second network is "activated", indicating that the card 22 has already been activated for communications over the second network, such as the Internet, the network 25 will allow for communication over network 28 and the user is connected to the requested URL (step 45). If the card status associated with the card's ESN for the second network is "not activated," the handset is directed to the carrier's authorization server (step 46) over network 25.

The handset is directed to a network application at the authorization server which provides an "activation page" on the user's network browser (step 48). This will prompt the user to enter any required information on the activation page (step 50), such as their identification, the electronic serial number (ESN) of the handset or card, or the like, as determined by the cellular carrier. The authorization server 26 then carries out a network activation procedure (step 52) and activates the handset or card for wireless access to the Internet over the carrier network 25 (step 54). The carrier authorization server uses the parameters of the terminal or PC card 22 to which it is connected, and after validating that an activation page is necessary, initiates an over the air service provisioning (OTASP) or similar activation and provisioning procedure to activate the card. After this procedure is completed, the status of the ESN associated with the card in the network subscriber database will be changed to "activated", and the network will recognize the card as an activated card. This will change the network parameters to regular Domain Name System (DNS), Internet Protocol (IP), and gateway addresses allowing access to the full extent of the network, through dynamic host configuration protocol (DHCP) or a similar mechanism (step 55). At the same time, the activation status stored on the card 22 will be changed to "activated".

In the embodiment of FIGS. 1 to 3, the activation application is developed and provided by the carrier at their authorization server. The carrier can determine the activation process or "activation page". The card may be used with all PC platforms, e.g. Windows, Mac-OS, Linux, and the like, as long as they support a browser, with no modification to the card. No carrier interaction is required until the user has purchased and installed the card, at which point the user will be automatically directed by the network to the carrier's authorization server when it is determined that the card is associated with a "not activated" status in the network subscriber database. The authorization server will then carry out appropriate activation for that carrier's wireless Internet service.

This method and system for activating a wireless modem card for use over a cellular carrier network is easier for the customer, because they do not have to install any software and the activation process is automatically initiated simply by launching a web browser on the user's handset. It is also easier for the carrier, since they do not need to have someone signing up the customer for their wireless Internet service. Instead, the carrier network determines the activation status by checking the subscriber database for the connecting wireless modem card, and will direct any non-activated cards to the carrier's authorization server, which will then automatically initiate a service provisioning procedure and obtain any necessary information from the customer on an activation page which opens on their browser.

The system and method of FIGS. 1 to 3 applies primarily to a situation where a modem card such as an EVDO card is purchased and then installed in a computer, cell phone, PDA or the like. However, the same activation method may be used for handsets and other portable wireless devices which are initially manufactured with an installed wireless modem card for wireless Internet access.

Figure 4:
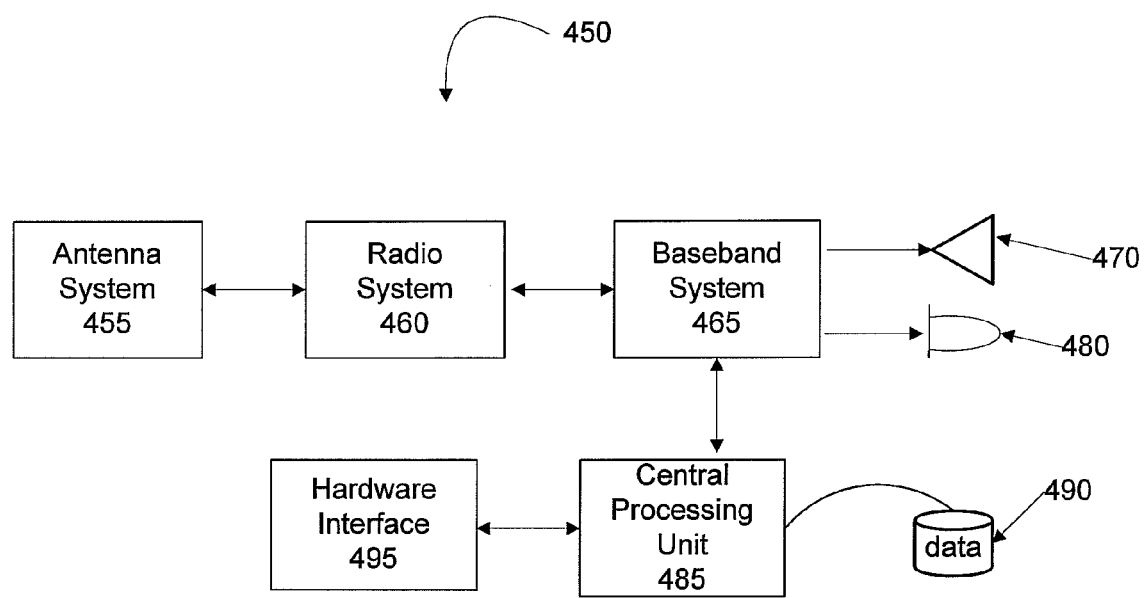
FIG. 4 is a block diagram illustrating an example wireless communication device that may be used in connection with various embodiments described herein.

FIG. 4 is a block diagram illustrating an example wireless communication device 450 that may be used in connection with various embodiments described herein. For example, the wireless communication device 450 may be used in conjunction with the handset described above in connection with FIGS. 1 to 3. A similar wireless communication device may be used in conjunction with the authorization server described above in connection with FIGS. 1 to 3. However, other wireless communication devices and/or architectures may also be used.

In the illustrated embodiment, wireless communication device 450 comprises an antenna system 455, a radio system 460, a baseband system 465, a speaker 470, a microphone 480, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communicate over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the handset as previously described.

In this description, the term "computer readable medium" is used to refer to any media used to provide executable instructions (e.g., software and computer programs) to the wireless communication device 450 for execution by the central processing unit 485. Examples of these media include the data storage area 490, microphone 480 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the features and functions of the handset previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method comprising:
receiving a request to access a web resource address ("URL") from a wireless modem device over a cellular network, where the URL is associated with a second network and is not associated with an authorization server associated with the cellular network;
determining, in response to receiving the request, that the wireless modem device is not activated for wireless connection to the second network associated with the URL;
directing the wireless modem device to an authorization server activation page instead of the URL;
receiving activation information from the wireless modem device via the authorization server activation page; and
activating, in response to receiving the activation information, the wireless modem device for connection to the second network.

2. The method of claim 1, wherein the activation step activating, in response to receiving the activation information, the wireless modem device for connection to the second network, comprises:
performing an over the air service provisioning (OTASP) procedure to complete the activation.

3. The method of claim 2, comprising:
changing, via the OTASP procedure, network parameters of the wireless modem device to public network parameters.

4. The method of claim 1, wherein receiving activation information from the wireless modem device comprises:
receiving payment for wireless network service.

5. The method of claim 1, further comprising:
coupling the wireless modem device to a host device.

6. The method of claim 5, wherein receiving the request to access a URL from the wireless modem device, comprises:
receiving the request from the host device via the wireless modem device.

7. The method of claim 5, further comprising:
uncoupling the wireless modem device from the host device.

8. The method of claim 1, wherein determining, in response to receiving the request, that the wireless modem device is not activated for connection to the second network associated with the URL, comprises:

obtaining an activation status for the wireless modem device from a cellular network subscriber database; and
determining that the wireless modem device is not activated based on the activation status.

9. The method of claim 1, wherein activating, in response to receiving the activation information, the wireless modem device for connection to the second network, comprises:
changing a wireless modem device activation status stored in a subscriber database to indicate that the wireless modem device is activated.

10. The method of claim 9, further comprising:
changing a wireless modem device network activation status stored on the wireless modem device to indicate that the wireless modem device is activated.

11. The method of claim 1, wherein activating, in response to receiving the activation information, the wireless modem device for connection to the second network, comprises:
updating network parameters of the wireless modem device wherein the network parameters enable access to the second network.

12. The method of claim 11, wherein updating network parameters, comprises:
updating gateway addresses that enable access to the second network.

13. A system for activating a wireless modem device for wireless access to a network, the system comprising:
a cellular network linked to a second network;
an authorization server linked to the cellular network, comprising a provisioning module configured to activate and provision non-activated wireless modem devices to enable access to the second network;
a subscriber database communicatively coupled with the authorization server and associated with the cellular network, the subscriber database containing an activation status for each of a plurality of wireless modem devices, said activation status related to access authorization to the second network; and
a communication module associated with the cellular network and configured to
receive web resource requests from said plurality of wireless modem devices to access a web resource address ("URL") of the second network over the cellular network, where the URL is associated with the second network and is not associated with the authorization server linked to the cellular network,
query the subscriber database, in response to receiving a web resource request from a requesting wireless modem device, to determine the requesting wireless modem device activation status, and forward said web resource request to the authorization server, instead of to the URL, in response to determining that the requesting wireless modem device activation status is a not activated status.

14. The system of claim 13, wherein the provisioning module is further configured to change the activation status for each of the plurality of wireless modem devices in the subscriber database.

15. The system of claim 14, wherein the provisioning module is further configured to change a network activation status stored in a wireless modem device.

16. The system of claim 13, wherein the provisioning module is configured with an activation page and the requesting wireless modem device is directed to the activation page instead of the URL.

17. The system of claim 15, wherein the provisioning module is further configured to update network parameters of the wireless modem device, corresponding to the network activation status, wherein the network parameters enable access to the second network.

18. The system of claim 17, wherein the provisioning module is further configured to update the network parameters including updating gateway addresses that enable access to the second network.

19. A wireless modem device comprising:
a data storage module, containing a unique identification number for the wireless modem device and a network activation status for access to a second network; and
a processor, operatively coupled to the data storage module, configured to
establish network communications over a cellular network to the second network by sending a web resource request over the cellular network to access a web resource address ("URL") of the second network, where the URL is associated with the second network and is not associated with a cellular network authorization server, and
update said network activation status in response to completion of an activation and provisioning procedure carried out by the cellular network authorization server.

20. The wireless modem device of claim 19, wherein wireless modem device network parameters corresponding to the network activation status prevent access to the URL of the second network and instead direct the wireless modem device to the authorization server so long as the network activation status is not activated.

* * * * *